United States Patent
Parker (10) Patent No.: US 12,041,929 B2
(45) Date of Patent: Jul. 23, 2024

(54) RIPPLE APPARATUS FOR WATERFOWL DECOY

(71) Applicant: George Parker, Santa Rosa, CA (US)

(72) Inventor: George Parker, Santa Rosa, CA (US)

(73) Assignee: Blue Bird Waterfowl, Inc., Santa Rosa, CA (US)

( * ) Notice: Subject to any disclaimer, the term of this patent is extended or adjusted under 35 U.S.C. 154(b) by 0 days.

(21) Appl. No.: 17/695,802

(22) Filed: Mar. 15, 2022

(65) Prior Publication Data

US 2023/0292740 A1 Sep. 21, 2023

(51) Int. Cl.
*A01M 31/06* (2006.01)

(52) U.S. Cl.
CPC .................... *A01M 31/06* (2013.01)

(58) Field of Classification Search
CPC ........................................ A01M 31/06
USPC ........................... 43/2, 3, 26.1, 26.2
See application file for complete search history.

(56) References Cited

U.S. PATENT DOCUMENTS

| | | | | |
|---|---|---|---|---|
| 843,588 A * | 2/1907 | Ditto | ................. | A01M 31/06 43/3 |
| 2,793,456 A * | 5/1957 | Argo | ................. | A01M 31/06 43/3 |
| 3,736,688 A * | 6/1973 | Caccamo | ........... | A01M 31/06 43/3 |
| 4,375,337 A * | 3/1983 | Yerger | ................ | E04H 4/0006 4/491 |
| 5,105,573 A * | 4/1992 | Mays | ................ | A01K 85/16 43/17.1 |
| 5,551,923 A * | 9/1996 | Worzella | ............ | A01M 31/06 472/137 |
| 5,809,683 A * | 9/1998 | Solomon | ............ | A01M 31/06 43/3 |
| 5,930,936 A * | 8/1999 | Parr | ................ | A01M 31/06 43/3 |
| 6,079,140 A * | 6/2000 | Brock, IV | ........... | A01M 31/06 43/3 |

(Continued)

FOREIGN PATENT DOCUMENTS

| | | | |
|---|---|---|---|
| CA | 2391478 A1 * | 12/2003 | ............ A01M 31/06 |
| DE | 9404049 U1 * | 10/1994 | |

OTHER PUBLICATIONS

Mojo Outdoors, Mojo Botty Shaker (https://www.mojooutdoors.com/products/accessories/mojo-booty-shaker).

*Primary Examiner* — Darren W Ark
(74) *Attorney, Agent, or Firm* — My Patent Guys; Christopher Pilling (57) ABSTRACT

A ripple apparatus for a wing spinning waterfowl decoy is provided. The ripple apparatus includes a decoy attachment element having a pair of attachment members, a body member pivotably coupled to the pair of attachment members via a pin, and a lower attachment member hingedly attached to the body member, wherein a first attachment member of the pair of attachment members is configured to be removably attached to a rotating motor shaft and a second attachment member of the attachment members is configured to receive a spinning wing of the decoy. A motion transfer element coupled to the lower attachment member. A ripple producing element is removably secured to the motion transfer element, wherein the ripple producing element is configured to be positioned approximate to the water surface such that ripples are created when the decoy is in operation.

6 Claims, 5 Drawing Sheets

(56) References Cited

U.S. PATENT DOCUMENTS

| | | | | |
|---|---|---|---|---|
| 6,092,323 A * | 7/2000 | McBride | A01M 31/06 43/3 |
| 6,170,188 B1 * | 1/2001 | Mathews | A01M 31/06 43/3 |
| 6,339,893 B1 * | 1/2002 | Solomon | A01M 31/06 43/3 |
| 6,339,894 B1 * | 1/2002 | Solomon | A01M 31/06 43/3 |
| 6,625,919 B1 * | 9/2003 | Davis | A01M 31/06 43/3 |
| 6,715,228 B1 * | 4/2004 | Price | A01M 31/06 43/2 |
| 7,043,865 B1 * | 5/2006 | Crowe | A01M 31/06 43/3 |
| 7,472,508 B2 * | 1/2009 | Myers, IV | A01M 31/06 43/26.1 |
| 7,788,838 B2 * | 9/2010 | Anthony | A01M 31/06 43/2 |
| 7,937,881 B2 * | 5/2011 | Price | A01M 31/06 43/3 |
| 8,347,545 B2 * | 1/2013 | Ivie | A01M 31/06 43/2 |
| 8,776,427 B1 * | 7/2014 | Lening | A01K 97/02 43/42.31 |
| 2002/0162268 A1 * | 11/2002 | Fulcher | A01M 31/06 43/3 |
| 2002/0178639 A1 * | 12/2002 | Daniels | A01M 31/06 43/3 |
| 2003/0101635 A1 * | 6/2003 | Fencel | A01M 31/06 43/3 |
| 2009/0241401 A1 * | 10/2009 | Price | A01M 31/06 43/3 |
| 2010/0287811 A1 * | 11/2010 | Ivie | A01M 31/06 43/2 |
| 2023/0371497 A1 * | 11/2023 | Bradley | A01M 31/06 |

* cited by examiner

RIPPLE APPARATUS FOR WATERFOWL DECOY

CROSS-REFERENCE TO RELATED APPLICATIONS

N/A

BACKGROUND OF THE INVENTION

1. Field of the Invention

The present invention relates generally to waterfowl hunting accessories and more particularly to a ripple apparatus for a waterfowl decoy.

2. Description of Related Art

When hunting waterfowl species, such as ducks, users often setup devices called decoys, waterfowl decoys, duck decoys or similar, which is essentially a man-made device resembling a duck or similar waterfowl species. It is well known that ducks and other waterfowl species are attracted to these devices when they are positioned in a lake or pond. Some decoys are elaborate and provide a motion element, including spinning wings, while others are configured float and move in the water. The stationary spinning wing decoys are useful to attract waterfowl from long distances. However, often there is no wind present and the water is free of natural ripples, or any other water movement. In these conditions, these stationary spinning wing decoys are much less effective. Consequently, a solution is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present invention to provide an attachment for a spinning wing decoy to create ripples in a body of water.

In order to do so a ripple apparatus for a waterfowl decoy is provided, comprising a decoy attachment element, wherein the decoy attachment element is configured to be removably attached to a rotating motor shaft of the waterfowl decoy; and, a puck coupled to the decoy attachment element configured to produce ripples or waves when the puck is positioned approximate to a water surface.

In one embodiment, the decoy attachment element comprises a pair of attachment members, wherein a first attachment member of the pair of attachment members is configured to be removably attached to the rotating motor shaft and a second attachment member of the attachment members is configured to receive a spinning wing of the waterfowl decoy. In another embodiment, the decoy attachment element further comprises a body member pivotably or rotatably coupled to the pair of attachment members. In yet another embodiment, the body member is coupled to a pole, wherein the puck is configured to be removably secured to the pole at a desired height along the pole. In one embodiment, the puck is disk shaped. In one embodiment, the puck is configured to mimic a sound of a waterfowl exiting the water as the puck contacts the water surface.

In another aspect of the invention, a ripple apparatus for a stationary wing spinning waterfowl decoy positioned above a water surface is provided, the ripple apparatus comprising a decoy attachment element comprising a pair of attachment members, a body member pivotably coupled to the pair of attachment members via a pin, and a lower attachment member hingedly attached to the body member, wherein a first attachment member of the pair of attachment members is configured to be removably attached to a rotating motor shaft and a second attachment member of the attachment members is configured to receive a spinning wing of the stationary wing spinning waterfowl decoy; a motion transfer element coupled to the lower attachment member; a ripple producing element removably secured to the motion transfer element, wherein the ripple producing element is configured to be positioned approximate to the water surface; and, wherein a first mode of operation the rotating motor shaft is configured to rotate the pair of attachment members and the rotational movement of the pair of attachment members is configured to convert to a vertical linear motion at lower attachment member such that the motion transfer element and removably secured ripple producing element travels up and down contacting the water surface at each full rotation of the rotating motor shaft, such that the ripple producing element creates ripples along the water surface when contacting the water surface.

In yet another aspect of the invention, a method to create ripples in a body of water using a stationary wing spinning waterfowl decoy is provided, comprising steps (a) positioning the stationary wing spinning waterfowl decoy at or above a water surface of the body of water, wherein the stationary wing spinning waterfowl decoy comprises at least one motor shaft configured provide rotational movement to at least one attached wing; (b) removing the at least one attached wing from the at least one motor shaft; (c) coupling a decoy attachment element to the at least one motor shaft, wherein the decoy attachment element is configured to convert the rotational movement to linear movement; (d) coupling a motion transfer element to the decoy attachment element; and, (e) securing a ripple producing element to the motion transfer element such that the location of the ripple producing element is approximate the water surface. And optionally, step (f) attaching the at least one detached wing to the decoy attachment element.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a ripple apparatus for a waterfowl decoy.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 1A:
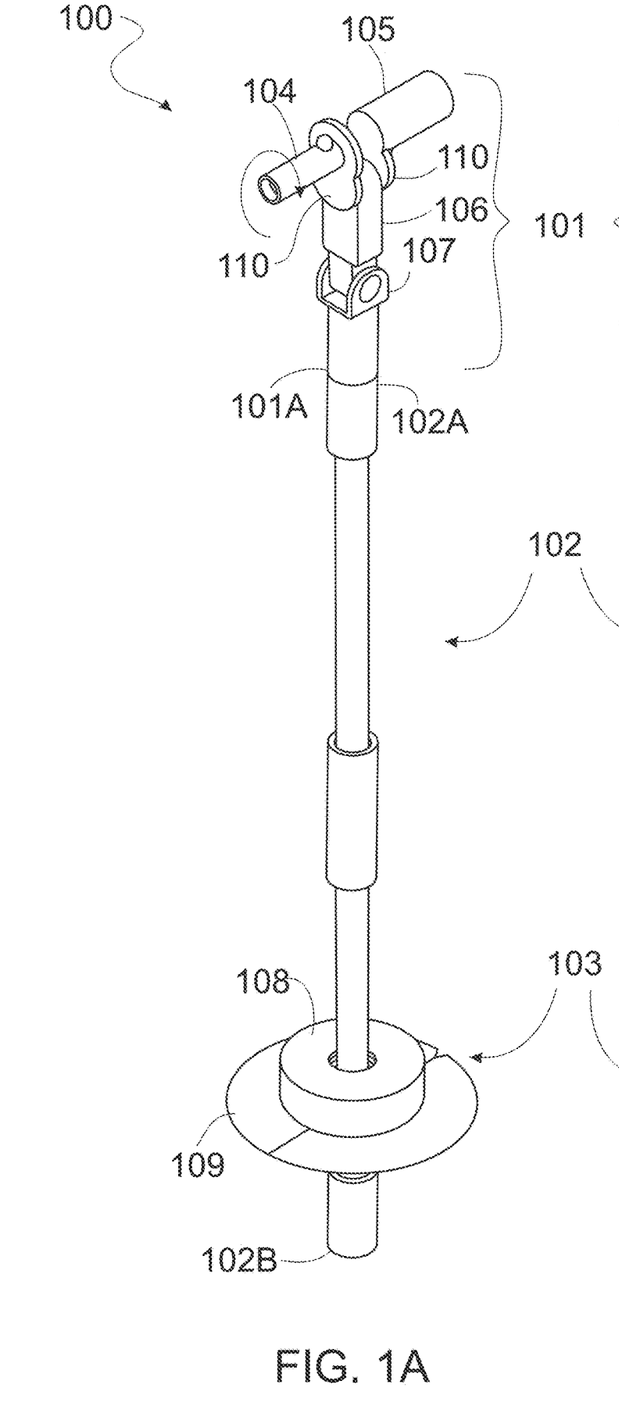
FIG. 1A a perspective view of a ripple apparatus for a waterfowl decoy according to an embodiment of the present invention.
Figure 1B:
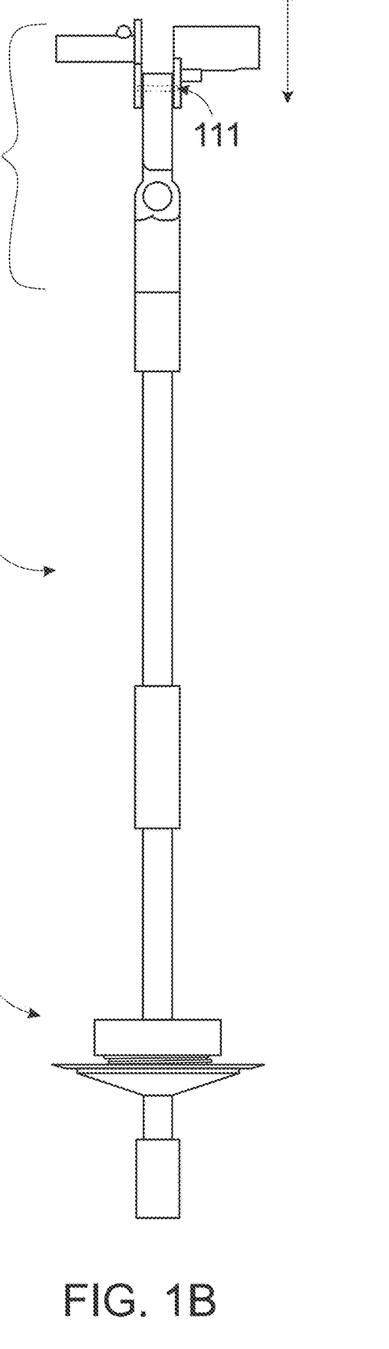
FIG. 1B is a front view of FIG. 1A.

FIGS. 1A-B are various views of a ripple apparatus for a waterfowl decoy according to an embodiment of the present invention. Referring now to FIGS. 1A-B, the ripple apparatus 100 is illustrated. In one embodiment, the ripple apparatus 100 comprises a decoy attachment element 101, pole 102, and puck 103. In one embodiment, the decoy attachment element includes a pair of attachment members 104 and 105, wherein one attachment member 105 is configured to be coupled to a spinning wing member of a waterfowl decoy (with the wing removed), and the other attachment member 104 is configured to be coupled to the wing such that the existing waterfowl decoy may operate as intended. Simply put, the ripple apparatus of the present invention is utilizing the motor and spinning shaft element to provide reciprocating motion, and more particularly rotation to the ripple apparatus, which then converts this rotation to linear motion. This will be discussed in further details below.

In one embodiment, each pair of attachment members 104 and 105 includes a pivoting disk 110, wherein the pivoting disk 110 is either attached, coupled, or formed with each respective attachment member. The pivoting disk 110 is rotatably attached to a body member 106 of decoy attachment element 101 via a screw, pin or shaft (111; FIG. 1B). During use, as the waterfowl decoy wing spinning shaft rotates, this is configured to rotate the connected attachment members, spinning the pivoting disk 110, which rotates the body member 106 about the screw, pin, or shaft 111. As the body member 106 rotates it remains in a vertical position, transferring the rotational motion to linear motion. In one embodiment, the body member is hingedly coupled to a lower attachment member 101A via hinge 107 forming the bottom portion of the decoy attachment element 101. In one embodiment, the pivoting disk and body member functions as a crank such that the rotational motion of the spinning shaft is transferred or converted to linear motion at the lower attachment member 101A.

Still referring to FIGS. 1A-B, the pole 102 is configured to be attached or coupled to the decoy attachment element 101 via the lower attachment member 101A. The means of attachment may be any attachment method known in the art, including but not limited to, a threaded connection, interference fit, magnetic connection, fasteners, etc. Preferably, it is an attachment method that is easy to disconnect the pole from the lower attachment member for ease of transportation, storage, and installation. In one embodiment, the pole 102 includes a top portion 102A and a bottom portion 102B, wherein the top portion 102A is configured to be removably attached to the lower attachment member 101A. In some embodiments, the bottom portion 102B is configured to be touching a ground surface (under water) when in use, in other embodiments, the bottom portion is positioned above the ground surface. In yet alternative embodiments, the bottom portion 102B of the pole 102 is comprised of one or more weights configured to provide stability to the apparatus.

To create the ripple effect during use, a puck 103 is provided. In one embodiment, the puck 103 comprises a connecting portion 108 and puck disk 109. In some embodiments, the position of the puck 103 along the pole 102 may vary and is adjustable by the user. In one embodiment, the puck 103 is positioned such that the puck disk 109 is at the height of the water line or water surface. In other embodiments, the puck 103 may be positioned above or below the water surface level. As the apparatus is in use and the pole is moving up and down, it in turn moves the puck up and down as well which creates a ripple effect in the water from the puck, and particularly the puck disk 109 bouncing, bobbing, oscillating, etc. at or near the surface of the water due to the reciprocating motion provided by the apparatus.

Figure 2:
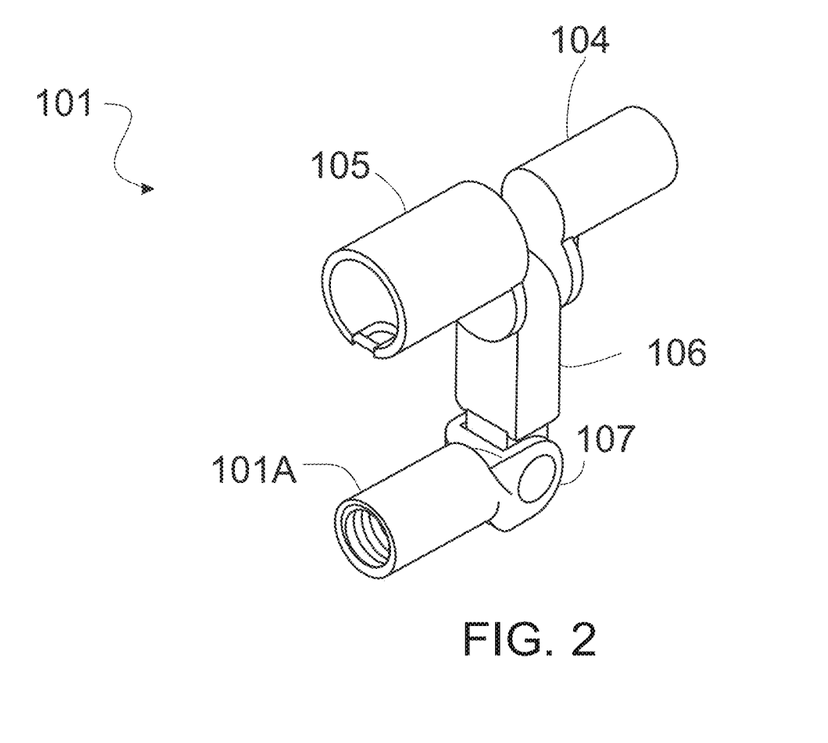
FIG. 2 is a perspective view of the decoy attachment element showing the lower attachment element rotated according to an embodiment of the present invention.

Referring now to FIG. 2, the decoy attachment element 101 is illustrated showing the lower attachment member 101A rotated via hinge 107. Female threading can be seen within the lower attachment member 101A, however, as previously described, the specific connection between the lower attachment member 101A and pole (102; FIG. 1) may vary. The pair of attachment members 104 and 105 are also illustrated with body member 106. It should be noted, that in alternative embodiments, the pole may directly attach to body member 106 and the functionality of the apparatus would be similar. In this embodiment, lateral motion of the pole during use would be provided, which could produce unique ripples or waves from the addition of the lateral motion. However, in the illustrated embodiment, the hinge 107 helps convert the rotational motion to linear motion as previously described enabling the body member to function as a crank. Further, the hinge 107 and lower attachment member 101A enables ease of installation and removal of the pole.

Figure 3:
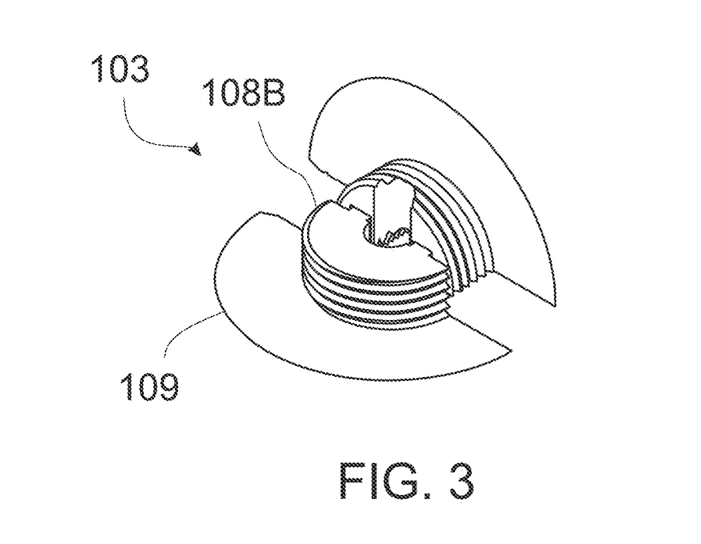
FIG. 3 is a perspective view of a puck removed from the apparatus according to an embodiment of the present invention.

FIG. 3 is a perspective view of a portion of a puck not secured to the pole of the apparatus according to an embodiment of the present invention. As previously mentioned, in some embodiments, the puck 103 is configured to be removably positioned along the pole (102; FIG. 1). There are several ways this may be accomplished. In one embodiment, the puck 103 may be formed with two portions, wherein the two portions may be connected via connecting portion 108B. In other embodiments, the diameter of the connecting portion may vary such that the puck is configured to be tightened in position. Likewise, a fastening element may also be used to secure the puck in position, such as tightening screw knob. Regardless of how the puck is secured to the pole, the important feature is that the position of the puck is adjustable on the pole such that the height of the puck disk 109 is adjustable and the puck may be moved to a desired position, e.g. at the water surface or below the water surface.

Figure 4A:
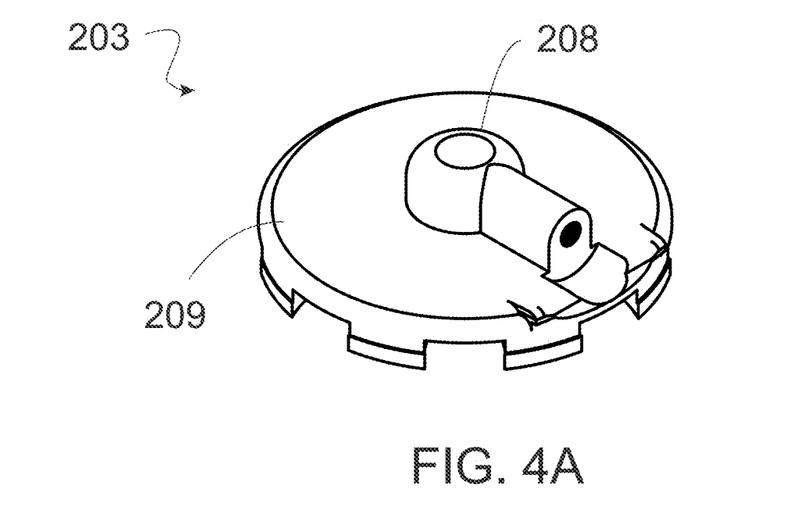
FIG. 4A is a top perspective view of an alternative puck according to an embodiment of the present invention.
Figure 4B:
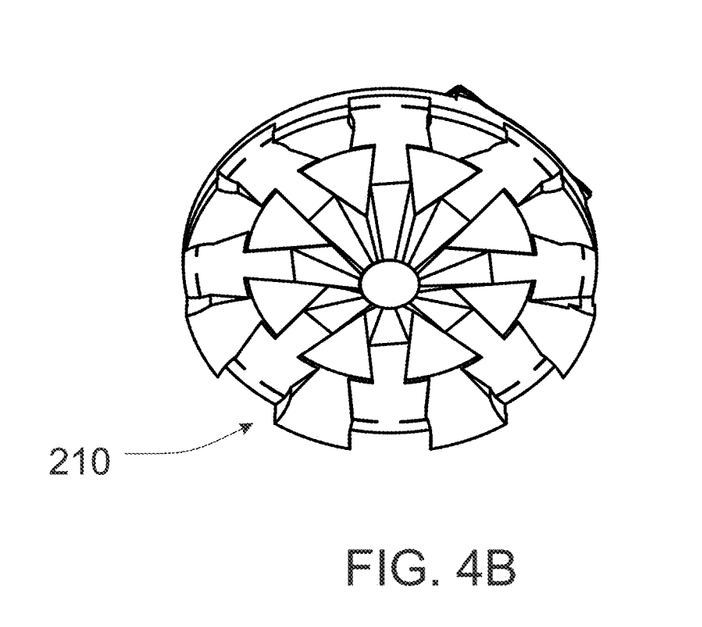
FIG. 4B is a bottom perspective view the alternative puck of FIG. 4A.

FIGS. 4A-B show various perspective views of an alternative puck 203. Similar to the puck previously discussed, the alternative puck 203 includes a connecting member 208 and puck disk 209. In some embodiments, the puck disk 209 comprises an array of triangular shapes of varying depths 210. Advantageously, the array of triangular shapes 210 is configured to make ripples as well as provide a sound as the puck hits the surface of the water during use. In one embodiment, the sound is a smacking sound, which is configured to imitate the natural sound made by the wings of birds or waterfowl as they exit the water. It should be understood, that two puck designs were provided, but others may be realized without departing from the spirit or scope of the invention. Conceptually the following characteristics are important for the puck: (a) having a shape which provides a ripple effect as the element (such as disk 109 or 209) hits or moves within the water; (b) configured to be adjustably positioned along the height (or length) of the pole; and (c) optionally having a shape that also creates a sound configured to imitate the natural sound made by the wings of birds or waterfowl as they exit the water as the shape hits the water. It should be understood, that although a disk like shape was illustrated and described, the puck may be any shape known the art that provides the aforementioned characteristics, including but not limited to, square, round, circular, ball, irregular, triangular, polygonal, or similar.

Figure 5:
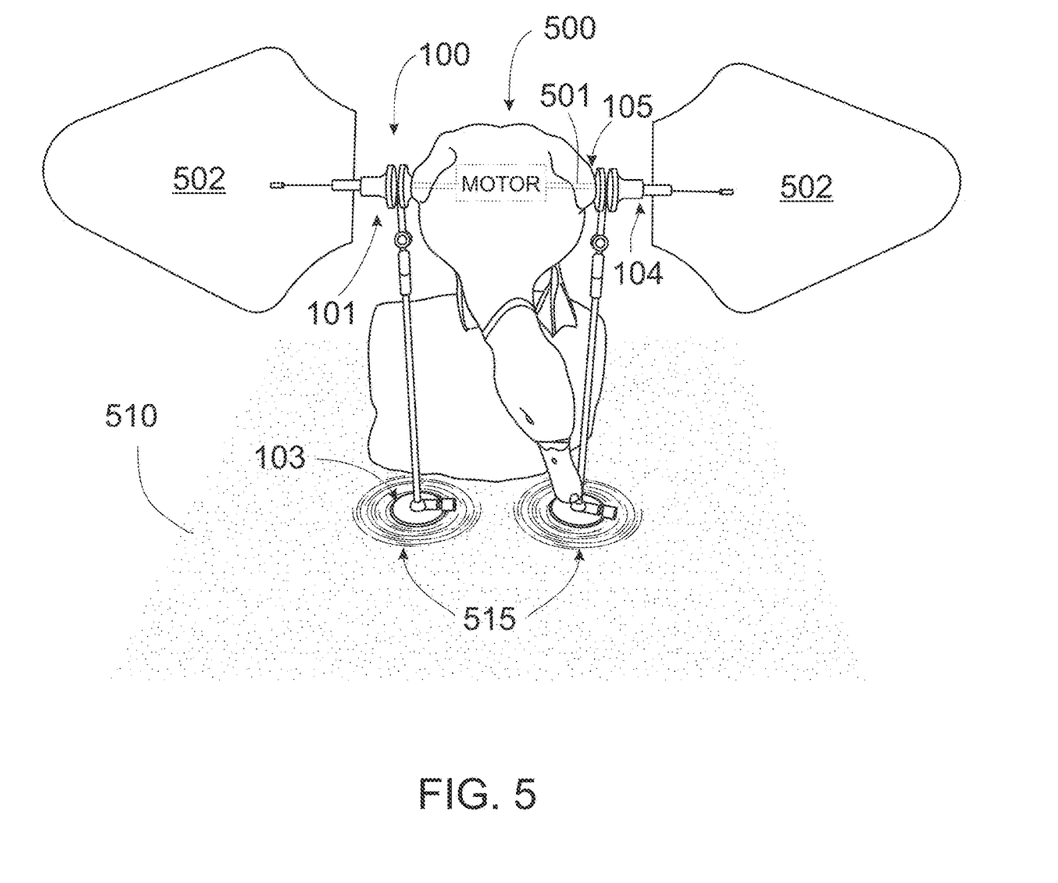
FIG. 5 is a perspective view of the ripple apparatus installed on a waterfowl decoy according to an embodiment of the present invention.

Referring now to FIG. 5, the apparatus 100 is shown installed and coupled to an existing waterfowl decoy 500. In one embodiment, the waterfowl decoy is a stationary decoy configured to be stationary when positioned in a body of water 510, i.e. the apparatus is intended for use with waterfowl decoys that do not provide any motion which may create or inadvertently create a ripple effect in the water. That said the apparatus may be used on any waterfowl decoy that has a motor configured to spin a shaft, which the decoy attachment element 101 may attach or be coupled to.

During use, one or preferably a pair of ripple apparatuses 100 are attached to the spinning shaft or shafts 501 of the decoy 500 via the decoy attachment element 101, and more particularly attachment end 105. Next, the wings are positioned on the free attachment end 104 such that the decoy is also configured to spin wings 502 as intended. Now, when the decoy is turned on and the motor is activated which makes the wings spin, this motion operates the apparatus as previously described to create the ripples 511 in the water and a splashing sound mimicking a bird taking off from the water. Advantageously, as the wings 502 spin, the puck 103 hits the water after every full rotation of the spin, providing a consistent ripple pattern in the water. Another advantage of the present invention is the weight of the apparatus forces a single side of the wing to show upwards towards the sky when the wings stop spinning. A current issue with spinning waterfowl decoys is the intermittent stopping of the wings causes the bright white side of the wing to show upwards as opposed to the color side. In these situations, the waterfowl will leave the area as the color is unnatural. The bright white side and color combination creates a strobe effect during use, however when the wings stop spinning it could leave the wings in a bad position to attract waterfowl if the bright white side is positioned toward the sky. Thus, the weight of the apparatus attached to the wing spinning shaft 501 forces the wings to rest with the color side up to preventing this issue from occurring.

Another advantage of the present invention is the apparatus does not require the user to purchase a complete ripple producing system. Rather the user may utilize their existing wing spinning stationary waterfowl decoy. Another advantage of the present invention is the ripples created from the apparatus will provide motion on any other floating decoys that have been placed in the body of water, increasing the effectiveness of all decoys in the water. Yet another advantage of the present invention is the apparatus may be used without the wings installed as specific hunting seasons prevent the use of spinning wing decoys. Again, to reiterate, decoys are far less effective with no wind, as there are no waves, ripples, or motion in the water. This invention solves this issue when the water is still due to no wind.

It should be understood that there are many different brands of wing spinning waterfowl decoys available, including but not limited to, decoys from Mojo®, Avian X®, and Lucky Duck®, and as a result the size, shape, and connection method of the pair of attachment members 104 and 105 will vary depending on which brand is used. For example, in some embodiments, attachment members utilize a threaded connection. In other embodiments, the attachment members utilize a clip-on attachment. Yet in other embodiments, the connection is magnetic. Several versions may be provided to the user such that the apparatus can be used with any brand wing spinning waterfowl decoy. Further the spinning waterfowl decoy may be positioned and anchored into a ground surface below the water via a stake, or float on the surface of the water.

Any materials as well known in the art may be used and selected for their specific properties. The apparatus may include a combination of materials, including but not limited to metals, plastics, wood, rubber, etc.

For the purposes of the claims, the pole may be defined as motion transfer element as its function is to transfer the linear motion of the lower attachment member to the puck. In the same spirit, the puck may be defined as a ripple producing element as its function is to produce ripples in the water.

Figures 6A, 6B:
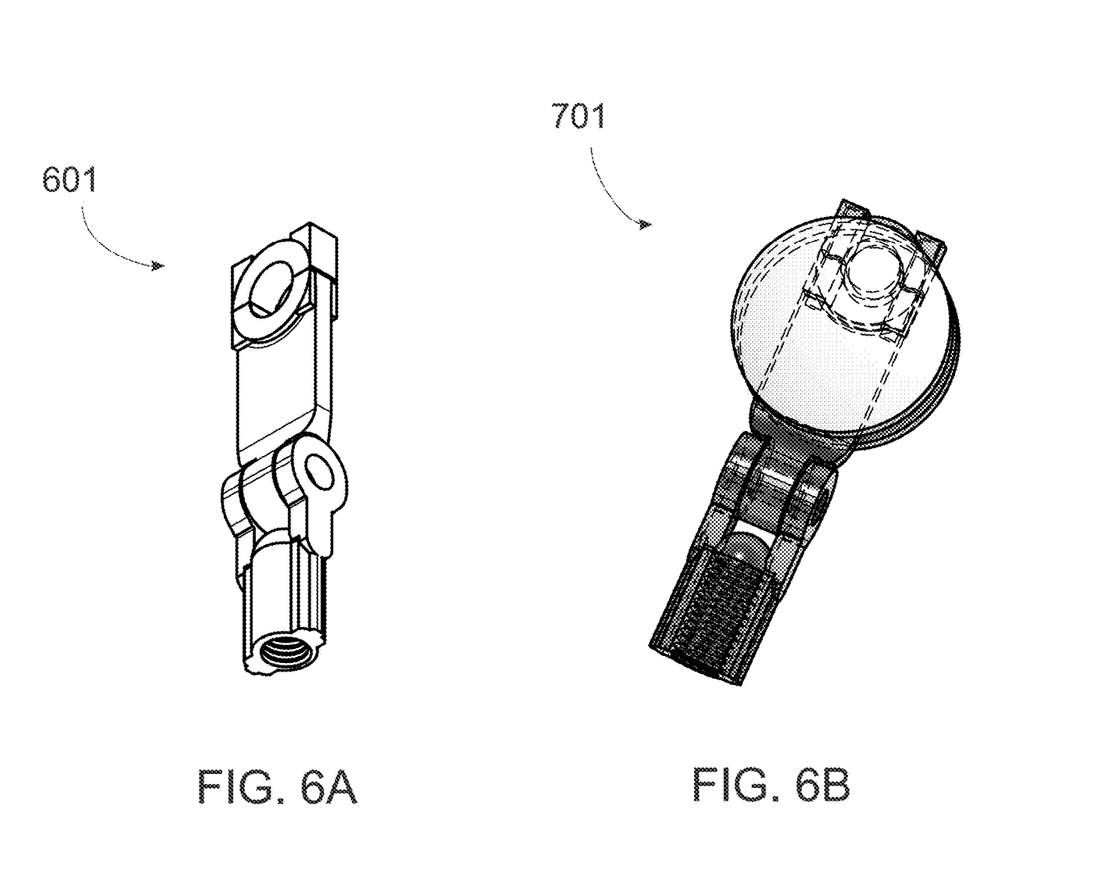
FIG. 6A is a perspective view of a portion of an alternative decoy attachment element according to an embodiment of the present invention.
FIG. 6B is a perspective view of a portion of an alternative decoy attachment element according to an embodiment of the present invention.

FIGS. 6A-B show two alternative embodiments of portions a decoy attachment element (601/701) with the pair of attachment members removed. Illustrated are the body member and lower attachment member of the decoy attachment element.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

For example, although a rigid pole is provided, the pole may be replaced with a string or flexible object. Further, the apparatus may be combined and built-in to its own waterfowl decoy where the decoy attachment element is fixed or part of the waterfowl decoy. Similarly, the apparatus may be powered by a different motor, such as a stand-alone motor to provide the rotation to the apparatus. Also, the motor can pull or provide a direct linear force (as opposed to the rotational force discussed) to move the puck to create the ripples.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A ripple apparatus for a waterfowl decoy comprising:
    a decoy attachment element, wherein the decoy attachment element is configured to be removably attached to a rotating motor shaft of the waterfowl decoy;
    a puck coupled to the decoy attachment element configured to produce ripples or waves when the puck is positioned approximate to a water surface;
    wherein the decoy attachment element comprises a pair of attachment members, wherein a first attachment member of the pair of attachment members is configured to be removably attached to the rotating motor shaft and a second attachment member of the attachment members is configured to receive a spinning wing of the waterfowl decoy;
    wherein the decoy attachment element further comprises a body member pivotably or rotatably coupled to the pair of attachment members; and
    wherein the body member is coupled to a pole, wherein the puck is configured to be removably secured to the pole at a desired height along the pole.

2. The ripple apparatus of claim 1, wherein the puck is disk shaped.

3. The ripple apparatus of claim 1, wherein the puck is configured to mimic a sound of a waterfowl exiting the water as the puck contacts the water surface.

4. A ripple apparatus for a stationary wing spinning waterfowl decoy positioned above a water surface, the ripple apparatus comprising:
    a decoy attachment element comprising a pair of attachment members, a body member pivotably coupled to the pair of attachment members via a pin, and a lower attachment member hingedly attached to the body member, wherein a first attachment member of the pair of attachment members is configured to be removably attached to a rotating motor shaft and a second attachment member of the attachment members is configured to receive a spinning wing of the stationary wing spinning waterfowl decoy;
    a motion transfer element coupled to the lower attachment member;
    a ripple producing element removably secured to the motion transfer element, wherein the ripple producing element is configured to be positioned approximate to the water surface; and,
    wherein in a first mode of operation the rotating motor shaft is configured to rotate the pair of attachment members and the rotational movement of the pair of attachment members is configured to convert to a vertical linear motion at the lower attachment member such that the motion transfer element and removably secured ripple producing element travels up and down contacting the water surface at each full rotation of the rotating motor shaft, such that the ripple producing element creates ripples along the water surface when contacting the water surface.

5. The ripple apparatus of claim 4, wherein the motion transfer element is a pole.

6. The ripple apparatus of claim 4, wherein the ripple producing element is a puck having a disk shape.

* * * * *